United States Patent [19]
Goedert

[11] Patent Number: 4,741,598
[45] Date of Patent: May 3, 1988

[54] FOAM SPONGE TORQUE TRANSMITTING ASSEMBLY

[76] Inventor: Gerald L. Goedert, 3337 W. Adams St., St. Charles, Mo. 63301

[21] Appl. No.: 592,883
[22] Filed: Jun. 7, 1985
[51] Int. Cl.$^4$ ............................ G02B 5/12; B62J 3/00
[52] U.S. Cl. ...................................... 350/99; 340/134
[58] Field of Search .................... 350/97, 99; 340/134; 301/37 SA, 36 A, 37 L; 74/10.45, 517, 531, 813 R, 814, 819

[56] References Cited

U.S. PATENT DOCUMENTS

| | | | |
|---|---|---|---|
| 3,633,161 | 1/1972 | Price | 350/99 |
| 3,887,900 | 6/1975 | Goedert | 340/134 |
| 4,387,362 | 6/1983 | Gosswiller | 350/99 |

Primary Examiner—John K. Corbin
Assistant Examiner—Loha Ben
Attorney, Agent, or Firm—Henry W. Cummings

[57] ABSTRACT

In accordance with the present invention a foam torque transmitting drive member engages and is driven by the spokes of a bicycle, tricycle, or motorcyle, or other rotatable drive member. A rotatable driven member is located adjacent the foam drive member. Drive means extends from the foam drive member to the driven member or the foam driven member is driveably engaged by the drive member. The foam drive member is rotatably mounted upon a fixed bracket and a low friction bearing is provided between the foam member and the bracket. In a preferred embodiment the driven rotatable member is a reflector.

16 Claims, 4 Drawing Sheets

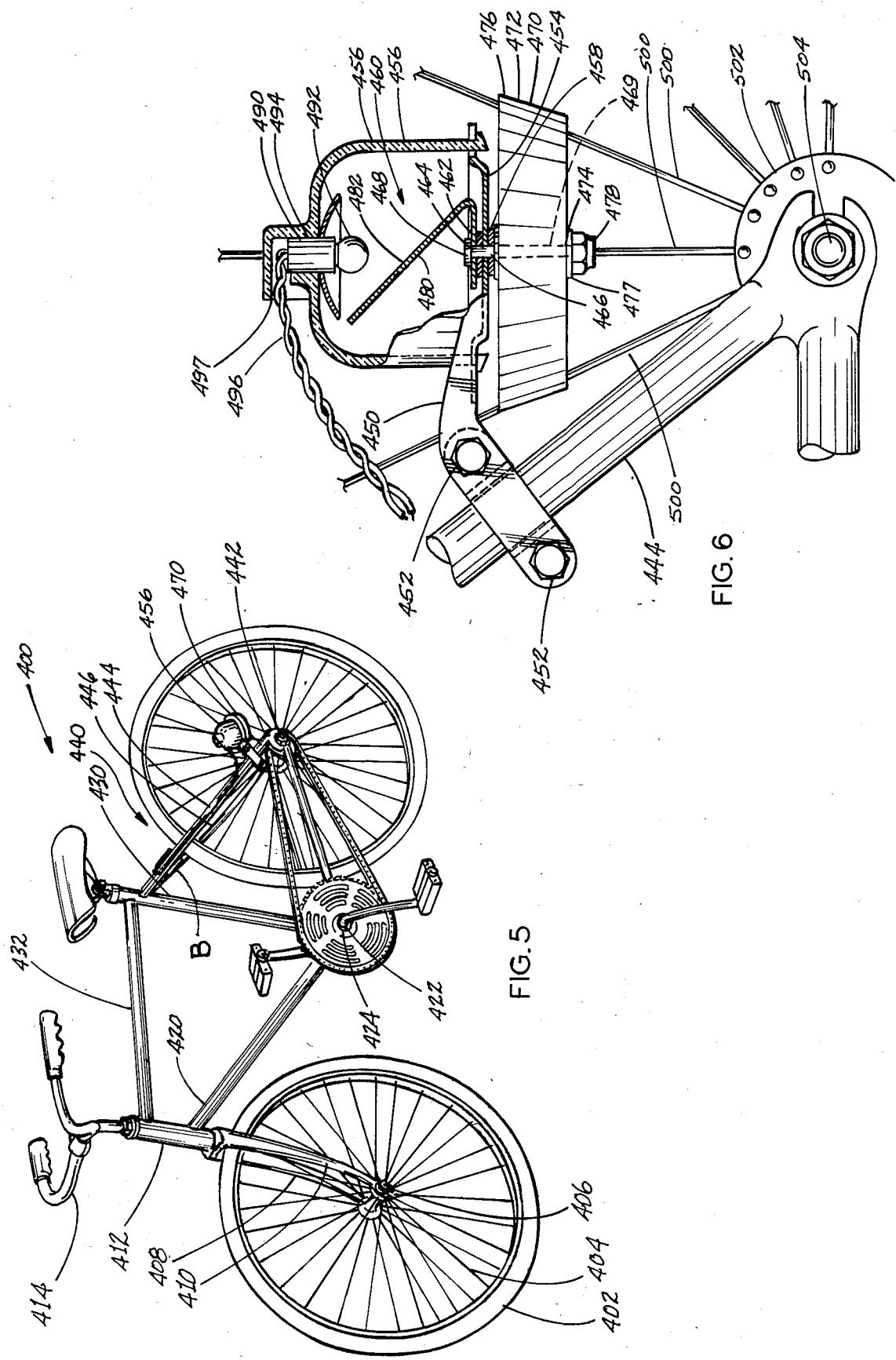

4,741,598

FOAM SPONGE TORQUE TRANSMITTING ASSEMBLY

BACKGROUND OF THE INVENTION

In my prior U.S. Pat. No. 3,887,900 granted June 3, 1975, I disclosed and claimed a bicycle reflector assembly driven from the spokes of a bicycle wheel through engagement with a plurality of bristles extending outwardly from a rotatable hub integral with a hub shaft. A force transmitting coupling was provided between the hub shaft and a vertically extending operating shaft including a socket in the operating shaft into which fit a non-round end of the hub shaft.

In addition a resilient spring was provided between the stub shaft and the operating shaft to absorb loads resulting from operating the bicycle.

Furthermore, another spring was provided between the under portion of the operating shaft and the reflector.

These springs and the socket joint made this prior reflector assembly very expensive.

In addition the bristles were not consistently effective in transmitting torque from the spokes to the operating shaft.

OBJECTIVES AND SUMMARY OF THE INVENTION

(A) Objects

An object of the present invention is to provide a reflector assembly for a bicycle, tricycle or motorcycle which is simple in construction and less expensive than the assembly illustrated in U.S. Pat. No. 3,887,900.

Another object of the present invention is to provide a drive assembly in which transmittal of torque from spokes or arms to a rotating member is more consistent.

Another object is to provide a cycle drive assembly which is more able to withstand bumps and jolts the cycle is subjected to in operation.

Another object is to provide an assembly which allows for misalignment with its driving member and for variations in spacing between driving member and foam drive member.

Another object is to provide an assembly which operates practically free of friction with the driving member.

Another object is to provide an assembly which is relatively quiet in operation.

(B) Summary

In accordance with the present invention a foam drive member engages and is driven by spokes, a tire, tire rim or arms of a drive member. A rotatable driven member is located adjacent to the foam drive member. Preferably this rotatable member is a reflector. Drive means from the rotatable member extends to the foam drive member and is driveably engaged by the foam drive member. In a preferred embodiment, spokes of a cycle drive the foam drive member which drives a cycle reflector. The foam drive member is rotatably mounted upon a fixed bracket and a low friction bearing is provided between the foam drive member and the bracket.

In one embodiment, shaft means attached to the driven member extends to the drive wheel and is driven by the drive member.

In another embodiment the foam drive member directly drivably engages the driven member.

THE DRAWINGS

FIG. 5 is a perspective view of a bicycle.

FIG. 6 is a detailed view of another embodiment of the present invention.

DESCRIPTION OF PREFERRED EMBODIMENTS

Figure 1:
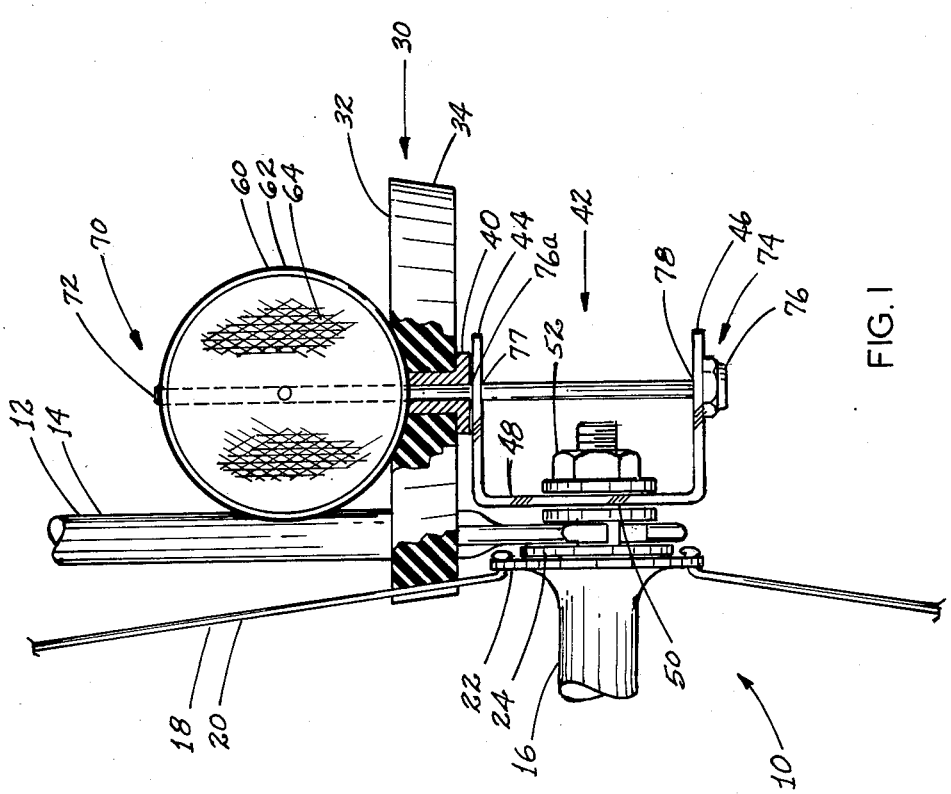
FIG. 1 is a partial front elevation view of a bicycle and illustrating one embodiment of the present invention.

In accordance with the present invention in FIG. 1 a bicycle is indicated generally at 10. The bicycle is of conventional construction including a frame 12 having downwardly extending fork members 14. A front wheel axle 16 extends laterally between the fork members 14. A wheel 18 includes a plurality of spokes 20. The spokes engage a spoke hub 22 and a bearing 24 allows the axle and spokes to rotate relative to the fork 14. See also FIG. 5 which illustrates a bicycle.

The reflector assembly of the present invention is indicated generally at 30 in FIG. 1 and includes a foam drive member 32 which is rotatable and which driveably engages the spokes 20. A low friction bushing 40 is provided between the body portion 34 of the foam drive member and a suitable support bracket indicated generally at 42.

The foam drive member 32 is made of soft flexible sponge material such as polyurethane foam. The foam drive member preferably has the following characteristics: (1) a density of approximately 1 to 3.0 pounds per cubic feet; (2) good tear resistance; (3) low water absorption properties; (4) resistant to degradation by ultraviolet radiation; (5) resistant to oil and grease; (6) a low durometer material little affected by variations in ambient temperature; (7) resistant to compression set; and (8) substantially unaffected by aging.

For example a preferred flexible, polyurethane foam is Type I, Class 2, Grade A or B produced according to Military Spec. MIL-P-26514E dated May 10, 1978, which is hereby incorporated herein by this reference. A copy of this military specification is in the application file. Other suitable foam materials will be apparent to those skilled in the art.

Figure 7:
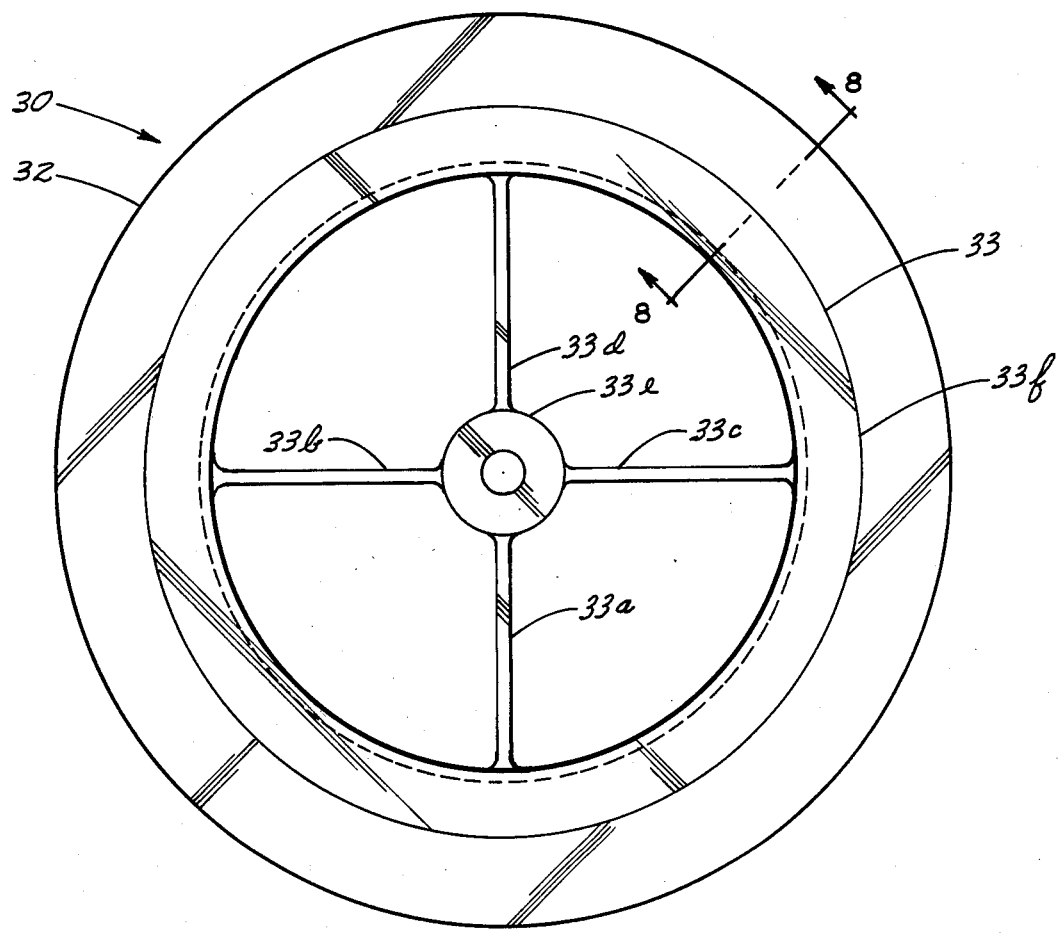
FIG. 7 is a plan view of another embodiment of a foam drive member including a center hub.
Figure 8:
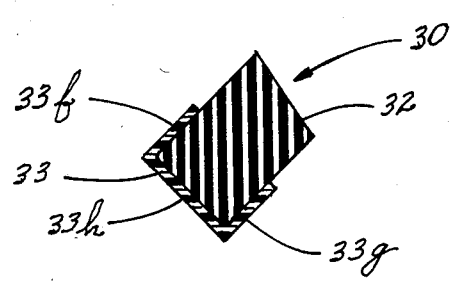
FIG. 8 is a sectional view looking in the direction of the arms along the line 8—8 in FIG. 7.

As shown in FIGS. 7 and 8 the foam drive member 32 may include a center hub 33 having center ribs 33a, 33b, 33c, and 33d terminating in a shaft engagement portion 33e. The foam is located within legs 33f and 33g of a channel shape 33h. This design would permit easy replacement of the foam ring to replace worn foam rings or to vary foam cross-section.

The engagement portion of the drive member 32 need not have any particular shape. It is only necessary that arms or spokes 20 engage this outer portion of the drive member as shown in FIG. 1 to impart rotative movement there to.

The support bracket 42 may be made of any suitable construction. In one embodiment it is a U-shaped member having a pair of horizontal legs 44 and 46 and a vertical leg 48 having an opening 50 through which the axle 24 extends. The axle 24 and the bracket 42 are then held in place with suitable fasteners 52.

The driven member is indicated in the drawings at 60. For example a driven reflector member 60 may be of conventional reflective configuration conveniently having a circular body portion 62 having a light reflective surface 64 at least on each side of the circular surfaces. The device need, however, not be circular. Furthermore, other driven members may be used whether on a cycle or elsewhere.

Shaft means 70 are provided which are used to hold the driven member 60 in place within the assembly 30. Shaft means 70 can conveniently comprise a shaft 72 extending downwardly through the driven member 60 and including means indicated generally at 74 for maintaining the reflector in place within the assembly. This, for example, may comprise a headed fastener 76 which may be attached to the shaft by force fit or with a threaded fitting. In the embodiment shown in FIG. 1 the shaft 72 extends through an opening 76a in the bushing 40 and through openeings 77 and 78 respectively in the legs 44 and 46 of the bracket 42.

The foam drive member 32 may directly engage and thereby drive the driven member 60, as illustrated in FIG. 1. Alternatively, the shaft 70 may be integrally connected to the drive member 32 and the driven member spaced from the drive member 32.

Figure 2:
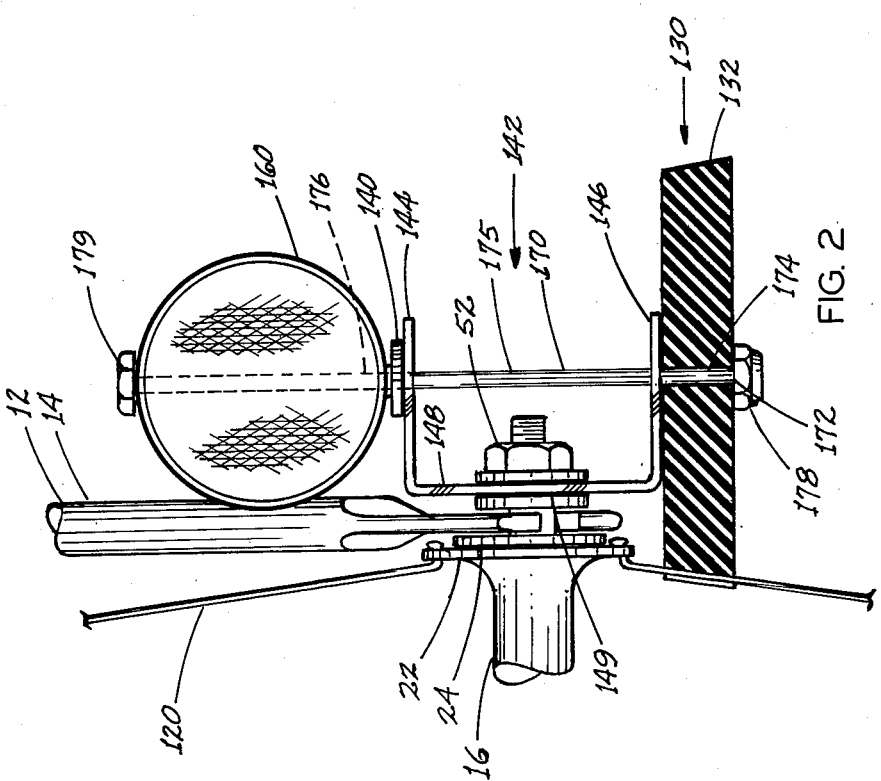
FIG. 2 is a view similar to FIG. 1 illustrating another embodiment of the present invention.

Thus, for example, in FIG. 2 the foam drive member 130 is located below the bracket member 142. As was previously the case the bracket member 142 includes an upper leg 144, a lower leg 146 and a vertical leg 148 which includes an opening 149 which receives the axle bearing and the fastener 52 holding the bracket in place.

However, the axle 16 drives spokes 120 which driveably engage the drive member 130 and rotate the same. In this embodiment an operating shaft 170 includes a portion 172 extending into the body portion 132 of the drive member and the portion 172 is integral with the drive member by virtue of an interference fit indicated at 174. Shaft member 170 includes a portion 175 extending between the brackets 144 and 146 and an upper portion 176 passing through a low friction bearing 140 to a driven reflector 160 of the type generally described in FIG. 1 in connection with reflector 60. A lower fastener 178 holds the shaft in place extending within the drive wheel 130 and another fastener 179 holds the shaft in place within the reflector 160.

Figure 3:
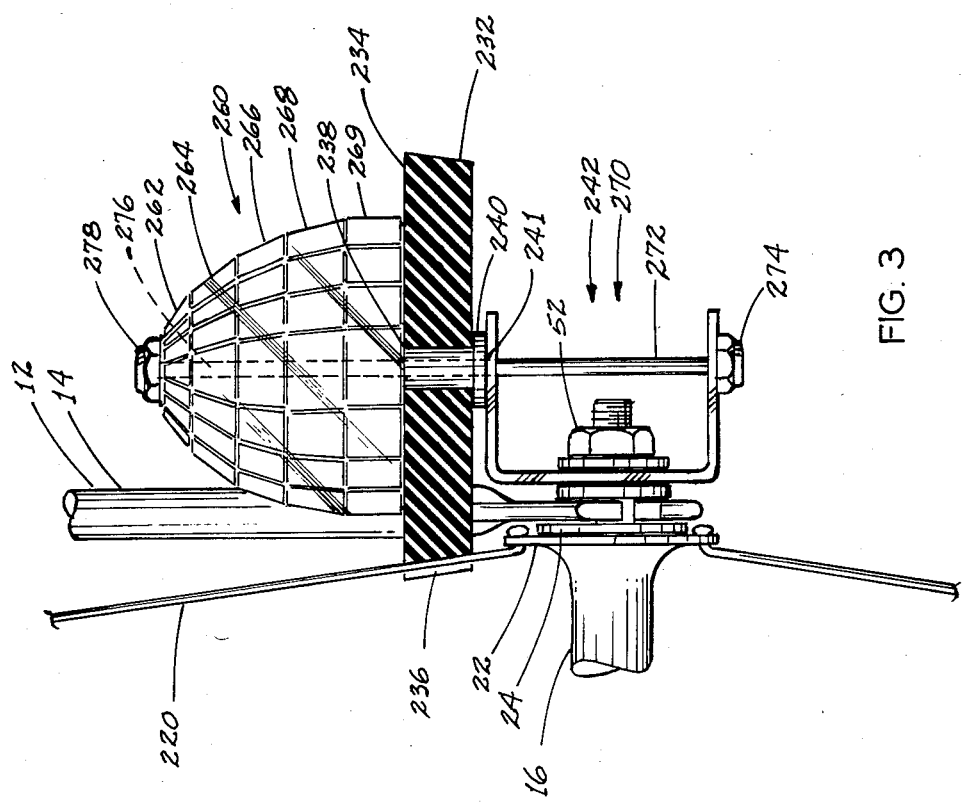
FIG. 3 is a view similar to FIG. 1 and illustrating another embodiment of the present invention.

The embodiment shown in FIG. 3 is similar to the embodiment shown in FIG. 1. In this embodiment, spokes 220 drive a foam drive member 232 including a body portion 234 and a spoke engagement portion 236. The foam drive member rests upon a bearing 240 which in turn is supported by a bracket 242 constructed generally in the same manner as bracket 42. A shaft indicated generally at 270 includes a lower portion 272 located within the bracket 242 having a lower fastening head 274. The shaft 270 extends through an opening 241 in the bearing 240 and through an opening 238 in the foam drive member 232. The upper portion of the shaft 276 is located within a driven faceted mirror reflector indicated generally at 260. Such reflectors are commercially available and of known construction. Such reflectors include a plurality of flat surfaces 262, 264, 266, 268, 269 generally located at greater diameters about the axis of the mirror reflector. As is known by those skilled in the art, the mirror may be formed of acrylic material and may be aluminized to provide a particularly effective reflecting surface. A cap 278 is provided at the top of reflector to hold the shaft 270 in place.

Figure 4:
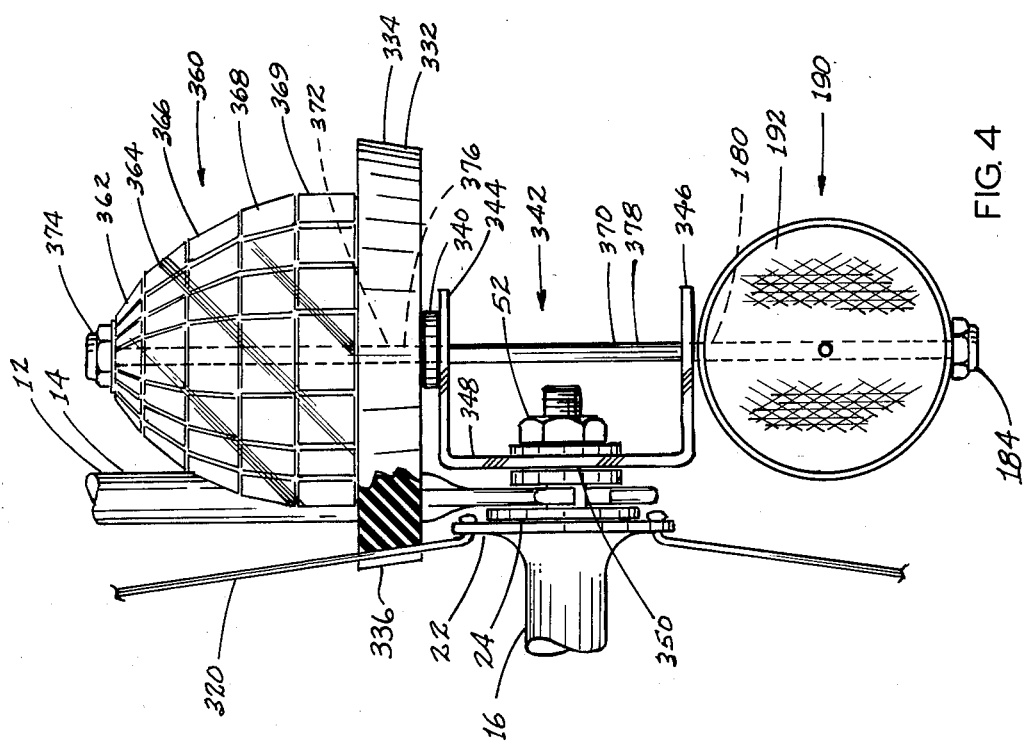
FIG. 4 is a view of another embodiment of the present invention in which arms rather than spokes drive the torque transmitting member of the present invention.

As shown in FIG. 4, it is possible to combine a mirrored reflector 360 with a prism lens reflector 190. In this embodiment the foam drive member 332 is driven by the spokes 320 by engaging the outer engagement portion thereof 336. The body portion 334 of the foam drive member rests upon a bushing 340 supported by a bracket 342 including an upper horizontal leg 344 and a lower horizontal leg 346 joined by a vertical leg 348 through which the axle bearing 324 extends and is held in place by a fastener 52.

In this embodiment above the foam drive member 332, a driven faceted mirror reflector 360 is located. This mirror reflector is constructed generally in the same manner as the mirrored reflector 260 in the previous embodiment, and its description will not be repeated except to say that it includes a plurality of mirror surfaces 362 to 364, 366, 368 and 369.

An operating shaft 370 includes an upper portion 372 extending through the reflector 360 and a cap 374 holds the shaft in place within the mirrored reflector. The shaft includes a portion 376 which is drivably engaged, for example, by interference fit with the body portion 334 of the foam drive member 332. Thus the shaft is rotatably driven by the spokes 320 and the foam drive member 332. The shaft 370 includes an intermediate portion 378 extending within the bracket 342 and includes a lower portion 180 which is located in a prism lens reflector 190 generally of the type previously described in connection with FIGS. 1 and 2. As described above, this prism lens reflector includes a body portion 192 which is generally circular in shape and includes reflecting surfaces on either side of this body portion. Shaft portion 180 is in driving engagement with the prism reflector body portion 192.

The advantage of the embodiment shown in FIG. 4 is that it includes both the faceted mirror reflector which is particularly adapted for day use and the prism reflector which is adapted for night use.

Another embodiment of the invention is shown in FIGS. 5 and 6. In FIG. 5 a bicycle 400 includes a front wheel 402 having spokes 404 and an axle 406 extending between forked arms 408 and 410. These forked arms engage a vertically extending frame member 412 which handle bars 414 are attached to. The frame includes a diagonal member 420 extending downwardly to support pedals 422 which extend out of a transversely extending shaft 424. A vertically extending support member 430 extends upwardly and an optional crossbar 432 is provided between frame member 412 and frame member 430. In addition, a downwardly extending frame member 440 is provided extending from the frame member 430 to a transversely extending axle 442, which includes respective arms, 444 and 446, which support the axle 442.

As shown in FIG. 6, mounted on the frame member 444 is a supporting bracket 450 held in engagement with the frame member 444 by means of suitable fasteners 452. The bracket 450 includes a laterally extending plate 454 upon which is mounted a snap-on lens housing 456 made of transparent material. Located upon the plate 454 is a low friction bushing 458. Resting upon the bushing 458 is a rotating mirror indicated generally at 460. The mirror comprizes a lower plate member 462 containing an opening 464 to receive a non-round shaft portion 466 having a holding fastener thereon 468. The shaft member extends downwardly and includes a non-round portion 469 located within a foam drive member 470. The drive member 470 includes a body portion 472 having an opening therein 474 which cooperatively engages the non-round shaft portion 469. The foam drive member also includes an arm or engagement portion 474 in this embodiment including an inclined surface 476. However, as mentioned above, the particular contour of the engagement surface is not critical. A plate 477 and a headed fastener 478 hold the shaft in position within the foam drive member 470.

As mentioned above, the upper portion of the shaft is in driving engagement with the horizontally extending mirror member 462. The mirror member 462 is integral with an inclined mirror portion 480, including a reflecting body portion 482.

Located within the housing 456 is a light 490 including a bulb 492 in threaded engagement with a housing 494. Leads 496 extend through an opening 497 in the housing 456 to a source of electrical power. This source may include a battery B located in the rear portion of the cycle and extending between the arms 444 and 446. Alternatively, the leads could extend to a generator located in another portion of the cycle. Finally, the assembly need not be mounted on a movable member. It may be located on a fixed member and used to warn individuals of a dangerous condition or attract them to a particular place or door opening.

In any event, it will be apparent that in operation the arms or spokes 500 extending from a hub 502 integral with a driven rotatable axle 504 impart rotative movement to the foam drive member 470. As mentioned previously, tolerances between the driven member 500 and the foam drive member 470 is less than in many prior applications. The rotative movement applied to the foam drive member is transmitted to the shaft 469 and to the mirror 480. The mirror rotates and directs the light from lamp 492 in a 360° varying manner to attract the attention of nearby individuals. It is particularly adaptable to an application on a cycle where warning individuals of the forthcoming bicycle is important. Moreover, it may be utilized to designate an opening or a sign in other applications.

It is noted that all of the embodiments of the present invention include the foam drive member. The foam drive member is an inexpensive member and its flexibility and resiliency readily allows for liberal manufacturing tolerances in the other members. It provides an inherent cushioning effect to absorb bumps and jolts in the operation of the cycle. It allows for liberal manufacturing tolerances in the whole construction and for some bent spokes which frequently occur in the operation of bicycles and tricycles.

The foam drive member is relatively quiet in operation, permits misalignment with driving spokes, compensates for varying radial spacing from driven member to spokes, is a low friction system and little energy is required to operate it.

Through the use of the foam drive member the cost of the reflecting assemblies of the present invention are greatly reduced over the cost of the reflecting assemblies in U.S. Pat. No. 3,887,900, and provide improved operation.

The foam drive member also may be used to transmit torque from a rotatable drive member to a rotatable driven member. Dimensional tolerances normally required between drive and driven members are not significant due to the inherent flexibility and resiliency of the foam drive member. The present invention should not be construed as limited to cycle application, although excellent results have already been obtained in this application.

In addition to the reflecting assemblies described herein above, the foam drive member may also be used to drive an odometer, a speedometer or a generator.

What is claimed is:

1. A cycle reflector assembly comprising: an integral foam drive member located adjacent to, and in driving engagement with the spokes of the cycle; a rotatable, driven reflector located generally adjacent the foam drive member; and drive means extending from the foam drive member to the reflector whereby the reflector is rotated by the foam drive member.

2. A cycle reflector assembly according to claim 1 wherein the foam drive member is rotatably mounted upon a fixed bracket and a low friction bearing is provided between the foam drive member and the bracket.

3. A cycle reflector assembly according to claim 1 wherein shaft means attached to the reflector extend to the drive member and are driven by the drive member.

4. A cycle reflector assembly according to claim 1 wherein the foam drive member directly driveably engages the reflector.

5. A cycle reflector assembly according to claim 1 wherein the reflector is located above the foam drive member.

6. A cycle reflector assembly according to claim 1 wherein the reflector is located below the foam drive member.

7. A cycle reflector assembly according to claim 1 wherein the foam drive member drives two reflector assemblies.

8. A cycle reflector assembly according to claim 7 wherein one reflector assembly is located above the foam drive member and the other reflector assembly is located below the foam drive member.

9. A cycle reflector assembly according to claim 1 wherein the reflector has at least one circular face.

10. A cycle reflector assembly according to claim 9 wherein the reflector has a pair of circular faces.

11. A cycle reflector assembly according to claim 10 wherein the reflector has a plurality of vertical faces and a plurality of inclined faces.

12. A cycle reflector assembly according to claim 11 wherein the reflector is generally circular in cross-section.

13. A cycle reflector assembly according to claim 1 wherein the reflector is located adjacent a light source and the reflector reflects light as it is rotated.

14. A cycle reflector assembly according to claim 13 wherein the reflector member includes a first generally horizontal driven portion and a second inclined reflecting portion.

15. A cycle reflector assembly according to claim 13 wherein the driven reflector portion and the light reflecting portion are formed from a single member.

16. A cycle reflector assembly according to claim 13 wherein the assembly is mounted upon a bracket located in the rear portion of the cycle.

* * * * *